Nov. 28, 1950 — E. G. WILSON — 2,532,002
ROTARY LIQUID TREATING DRUM
Filed Aug. 25, 1948 — 4 Sheets-Sheet 1

Inventor
EVAN GEORGE WILSON
By
Linton and Linton
Attorneys

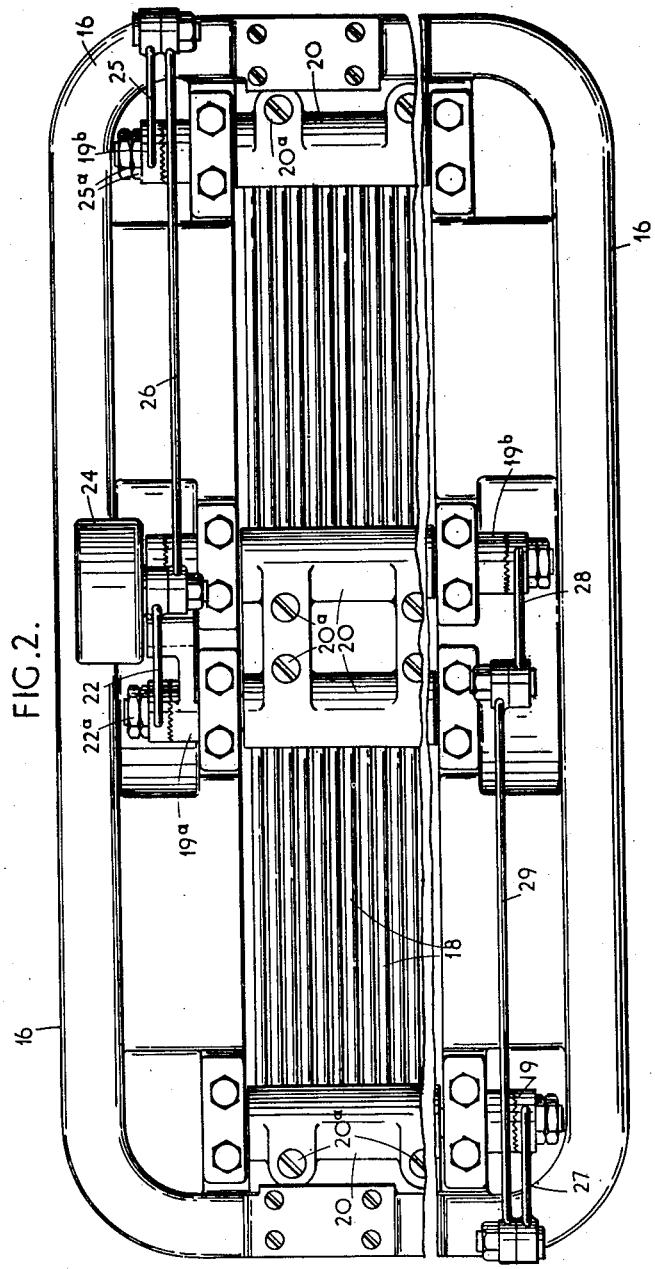

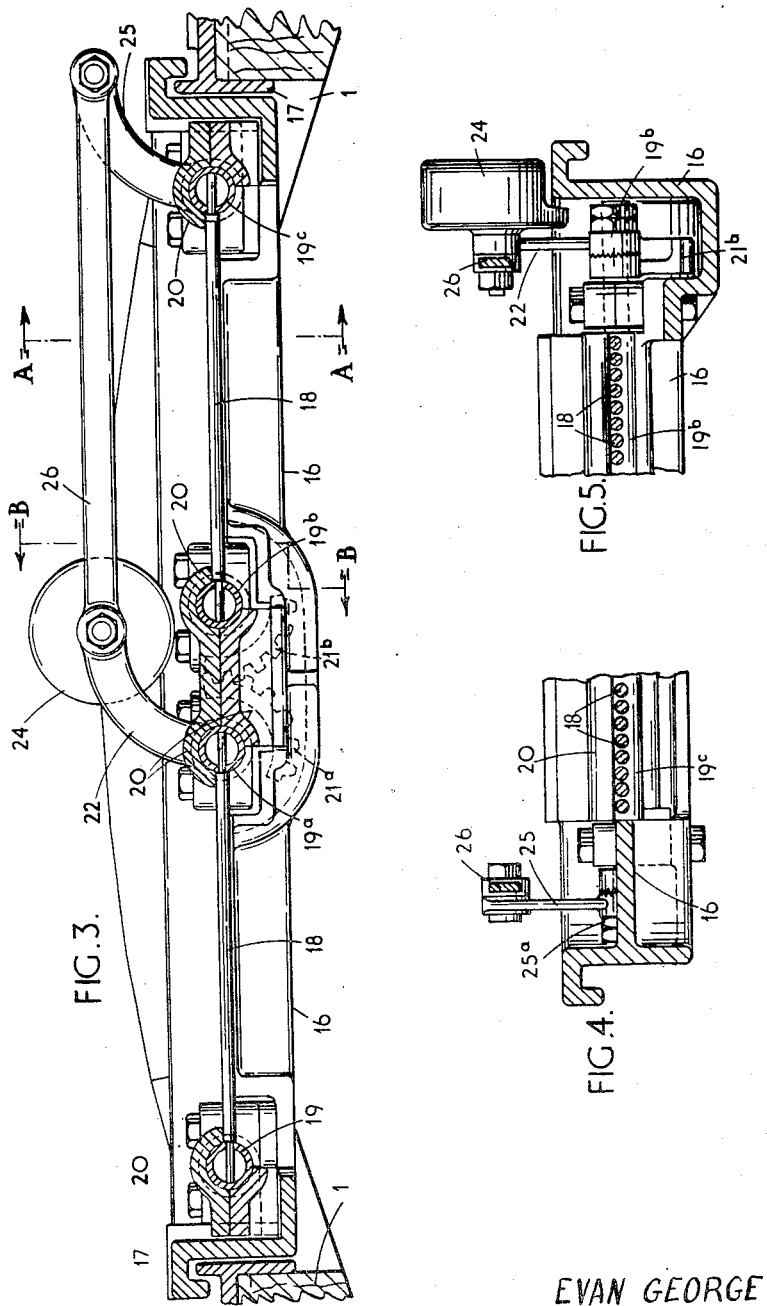

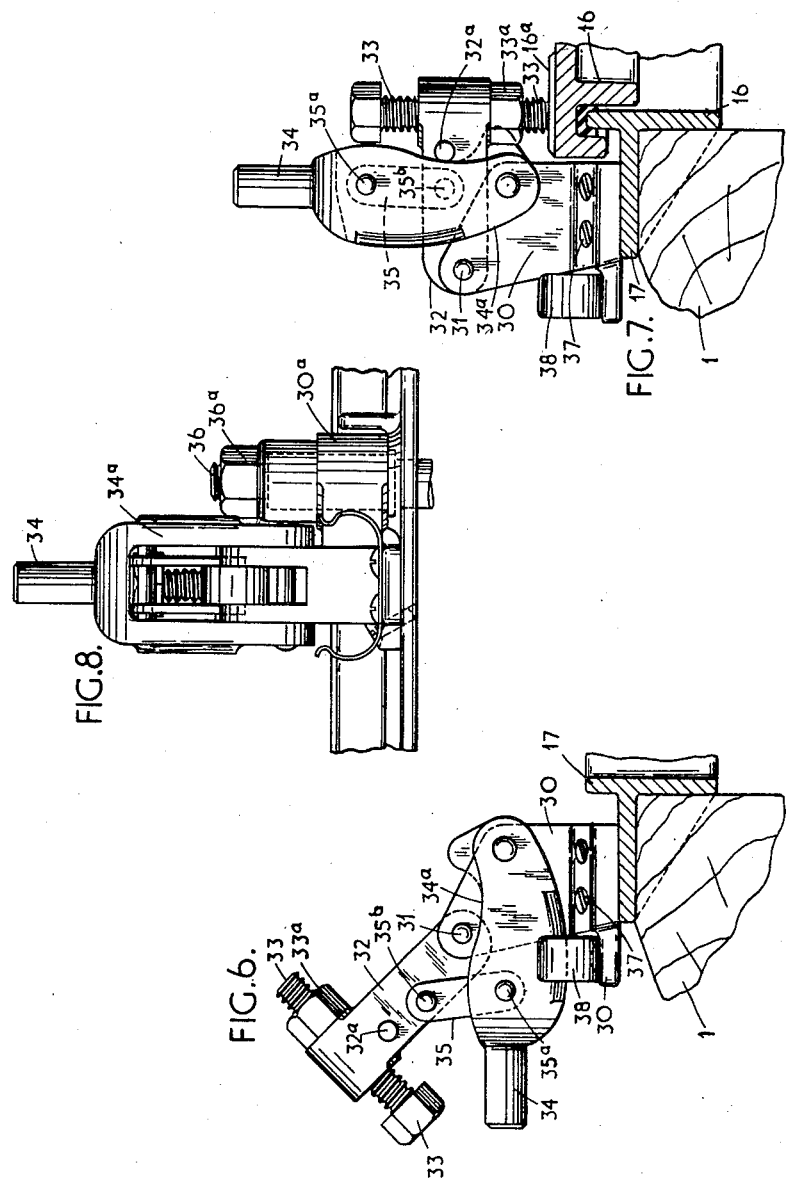

Patented Nov. 28, 1950

2,532,002

UNITED STATES PATENT OFFICE 2,532,002

ROTARY LIQUID TREATING DRUM

Evan George Wilson, Liverpool, England

Application August 25, 1948, Serial No. 46,055
In Great Britain August 25, 1947

6 Claims. (Cl. 69—30)

This invention mainly relates to the treatment of materials by liquids, having more particular reference to the rapid and effective draining of liquids from receptacles or their equivalent (hereinafter, for convenience of description only, designated "drum"), by automatic or self-clearing grid-like means designed to prevent contamination of the liquid to be drained, whilst permitting only small solid, or more or less solid, matters to pass therethrough.

Self clearing liquid drainage means, according to my invention comprises essentially a plurality of hingedly or pivotally supported rods or prongs which, when in closed position, co-operate to form a grating permitting adequate liquid drainage, but preventing all but very small pieces of material from passing therethrough. Usually said rods or prongs are disposed in a frame fitted in an aperture provided for its reception in the drum to be drained; and the rods may be arranged in opposed comb-like assemblies on shafts pivoted in bearings secured to the frame.

In the application of said grid to a rotary container such as a washing drum, counter weights actuated through the drum's rotation ensure the sudden separation and substantial self-clearing of the rods.

In the application of my invention to the treatment of materials by liquids in apparatus of rotatable drum type, my invention enables the treatment process to be accomplished more rapidly and efficiently than heretofore, thereby effecting a substantial saving of time and an economy in power and liquid consumption.

In particular, my invention is especially applicable to the washing of pieces of hides, skins, fleshings, and the like, as utilized in the manufacture of gelatine, and, if desired, the subjection, after washing, of said pieces to customary acid treatment, using the same apparatus. Existing apparatus possesses inter alia disadvantages in that insufficient physical shock is—owing to the accumulation of water—imparted to the material, with the result that the lime is not loosened from the interior of the pieces, and that, whilst additional clean washing liquid (hereinafter, for convenience of reference, designated "water") is continuously added, the used and dirty water is not drained off, or is not drained off with sufficient rapidity, with resultant waste of water, time, and power, and an imperfect washing of the material, this latter necessitating larger quantities of acid to neutralize remaining traces of lime before the required pH value is reached.

To obviate these and other disadvantages, the rotatable drum may include means whereby the material to be washed is cascaded or tumbled during rotation in order to apply the necessary physical shock; means whereby a spray or sprays of clean water is or are directed from components fitted within said drum over the falling material throughout its entire length in order to wash same; means whereby said components are brought successively into operation for a required length of time at a particular point in their rotary travel paths; automatic self-clearing drainage means which permit used water to escape immediately from the drum in order to prevent it from contaminating the clean water as it is introduced, and also to prevent accumulation of said water in such quantity as would interfere with the cascading of the material; and liquid-tight doors designed to enable the acid process and final washing to be carried out without moving the material from the apparatus.

In one embodiment, the apparatus comprises a revolubly mounted wooden drum, power driven, and fitted with axially-extending shelves projecting radially, or substantially so, in spaced disposition from the inner wall, and said drum being provided in the periphery thereof with self-clearing drainage grids for the discharge of used washing water, and liquid-tight doors for use during acid treatment.

The drum is mounted between a pair of, preferably cast iron, trunnion crosses of which one has a hollow axle whereinto water under pressure is fed to pass, via the trunnion arms, which are also hollow, to spray pipes fitted longitudinally at the rear of each shelf.

A stationary core piece within the hollow axle is provided with a port which admits water to, say, two adjacent trunnion arms, and therefore two spray pipes, only as the drum revolves, and said port is positioned (being adjustable) so that the spray pipes—preferably of rubber or similar substance—come successively into operation, in order to spray clean water directly and continuously upon the material within the drum as it is dropped or cascaded from the shelves in their rotary path.

I will further describe my invention with the aid of the accompanying sheets of explanatory drawings which illustrate, by way of example and not of limitation, one mode of embodying same.

In said drawings,

Fig. 2 is a detached plan view of a draining grid drawn to an enlarged scale as compared with the preceding views.

Fig. 3 is a longitudinal section of the grid in closed position, and

Figs. 4 and 5 are sections taken respectively on lines A—A and B—B, of Fig. 3.

Fig. 6 is a detached side view of a drainage grid securing handle drawn to an enlarged scale as compared with the preceding views.

Fig. 7 is a similar view of the handle in locked position, and

Fig. 8 is a view taken at right angles to that of Fig. 7.

Figure 1:
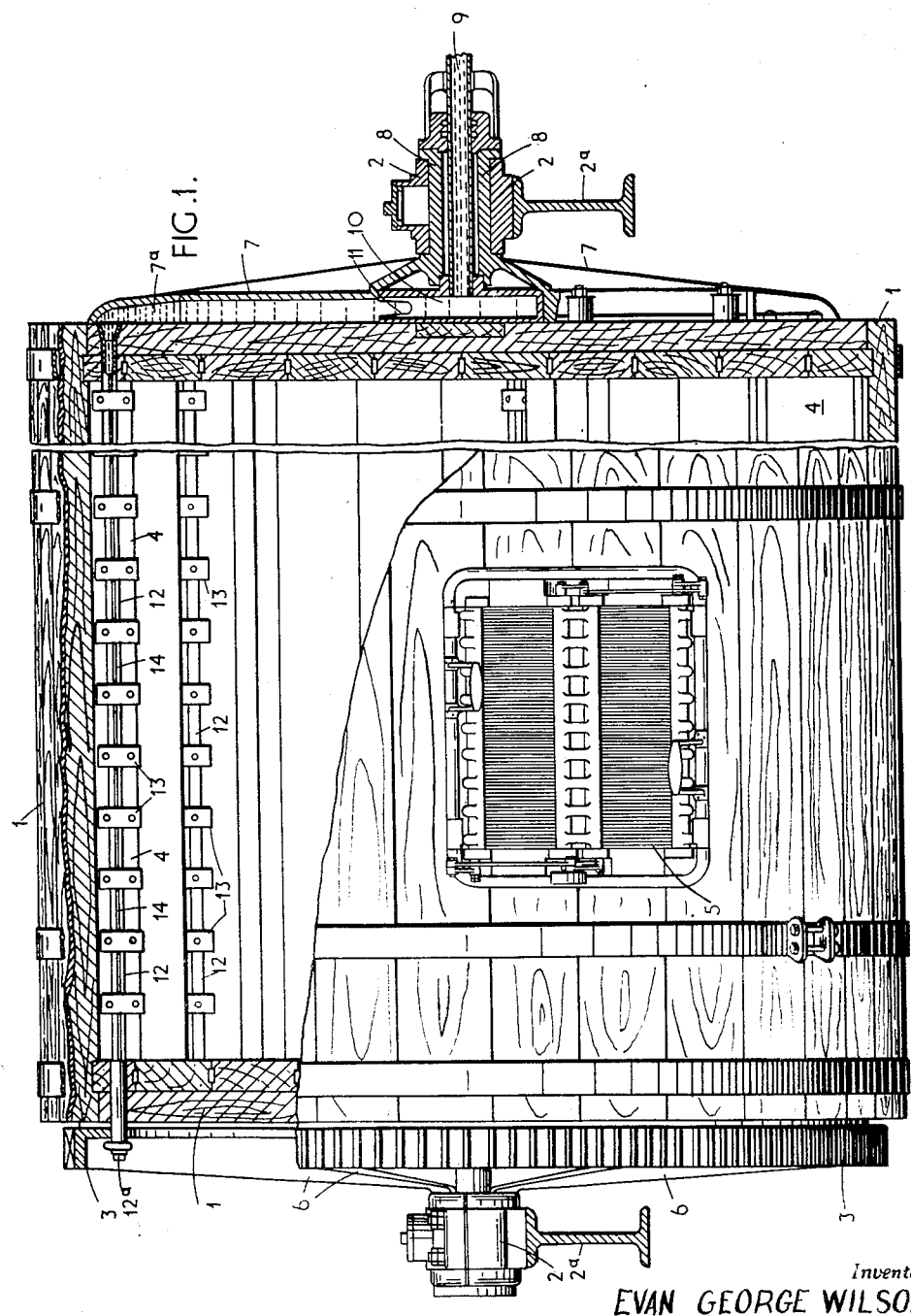
Fig. 1 is a part-sectional side elevation of a rotary washing drum.

Referring now to said drawings, in which like characters of reference denote like or equivalent parts wherever they occur, 1 denotes a rotatable wooden drum, supported on frame components $2^a$ in bearings 2, and power driven via a toothed driving rim 3 secured to one end. Said drum 1 is fitted internally with axially-extending shelves 4 which project more or less radially from the inner wall thereof, and said drum is provided with self-clearing drainage grids (hereinafter described) generally designated 5 wherefrom used washing water is discharged as drum 1 rotates in a washing operation.

Said drum 1 is mounted between a pair of, preferably cast iron, trunnion crosses 6, 7, of which 7 has a hollow axle 8 wherethrough water under pressure is fed, via a feed tube 9, to an adjustable hollow core piece 10—which remains stationary as the drum revolves—provided with a port 11.

Port 11 extends for a sufficient distance around the periphery of core 10 to admit water to the interiors $7^a$ of the hollow trunnion arms 7 as their inner ends come into successive alignment with said port 11 during the drum's rotation.

The outer ends of each of the hollow trunnion arms 7 communicate with a spray pipe 12, which pipes 12 are fitted, as illustrated, at the rear of shelves 4 by means of retaining pieces 13 screwed or otherwise secured thereto.

Pipes 12 extend the full length of drum 1, and their ends remote from their connection to trunnion arms 7 are fitted with removable plugs $12^a$ to facilitate cleaning and draining. A longitudinal slot 14 is formed in each pipe 12, and by rotating said tubes about their longitudinal axes the direction of the water sprayed from slots 14 can be adjusted as required.

Alternatively, there may be substituted for said spray pipes 12, rubber tubes which are longitudinally slit, such slits being normally maintained closed by said retaining pieces 13, but are adapted to open on the supply to the tubes of water under pressure.

It will be seen that, assuming feed tube 9 be connected to a supply of clean water under pressure, and drum 1 being rotated by any suitable power unit, clean water will be continuously sprayed upon material placed within drum 1— and which material is being dropped or cascaded from shelves 4 in their rotary path—from spray pipes 12 as they come into successive operation, the period of time during which they operate, and the points in their rotary path at which they commence and cease to operate, being determined by the position and size of the port 11 of hollow core piece 10.

The drainage grids 5 each comprise a frame 16 adapted for water-tight fitment over a framed aperture 17 formed in the periphery of drum 1, said frame carrying a plurality of hingedly supported metal rods or prongs 18 which, when in closed position, form a grid or grating permitting adequate water drainage but preventing all but very small pieces of material from passing therethrough with the water, which water may be led into settling tanks for the recovery of such particles as pass the drainage doors.

Rods 18 are mounted in opposed comb-like assemblies on shafts 19, $19^a$, $19^b$ and $19^c$ pivoted in bearing members 20 secured by screws $20^a$ to frame 16, members 20 being configurated as illustrated to limit the angular displacement of rods 18. Mounted on shafts $19^a$ and $19^b$ are toothed quadrants $21^a$, $21^b$ in mesh one with the other; and secured to an end of shaft $19^a$ by lock nuts $22^a$ is a curved arm 22 at the outer end whereof is carried a counterweight 24. A similar arm 25 is secured to an end of shaft $19^c$ by lock nuts $25a$, and arms 22 and 25 are connected by a link 26 pin-jointed thereto.

Shafts 19, $19^b$ carry at their ends remote from counterweight 24, arms 27 and 28, respectively, the outer ends whereof are connected by a link 29, similar to link 26.

It will be seen that, by means of counterweight 24 and the before described system of linkage, rods 18 will, during approximately the lower half of the drum's rotation, intermesh to form a sieve-like water drainage grid, and that during the upper portion of their travel path they will separate suddenly and swing inwardly on their respective shafts 19, $19^a$, $19^b$ and $19^c$, so as to discharge within drum 1 any particles of hide or flesh which may have become lodged between same and which would otherwise prevent complete drainage. Arms 22, 25, 27 and 28 are adjustable in relation to the shafts upon which they are mounted, and thus the timing of the opening and closing of grid 5 may be varied; and to further this end, an automatic catch, (not shown) also adjustable, may be fitted to said grids.

The frame 16 of each draining grid is secured in position over its respective apertured frame 17 by means of locking handles (see Figs. 6, 7 and 8) each of which comprises a bifurcated base member 30 wherein is pivoted on a swivel pin 31 an arm member 32 through the end whereof is screwed a, preferably stainless steel, set-screw 33 provided with a lock nut $33^a$. A bifurcated portion $34^a$ of a handle 34 is pivoted—forward of the pivoting point of arm 32—to base 30, and a connecting link 35 is pin-jointed by pins $35^a$, $35^b$ to arm 32 and handle 34, as illustrated. The base 30 has a bracket boss $30^a$ which is secured by a nut $36^a$ to a bolt 36 of frame 17, and screws 37 are also used to secure said base in position.

When a grid 5 is removed the locking handles are moved to the position shown in Fig. 6, and a spring clip 38 is provided to maintain the handles in this out-of-the-way position. When grid 5 is placed over frame 17, handle 34 is moved to the position shown in Fig. 7, and link 35 causes set-screw 33 to bear against surface $16^a$ of frame 16, the toggle action of link 35 effectively preventing accidental displacement of said handle. A limiting stop $32^a$ is provided on arm 32 as illustrated.

The speed at which drum 1 is rotated during a washing operation is preferably such that the material falling from shelves 4 will be projected clear of the material heaped in the bottom of the drum, and fall to impact upon the bare boards, thus to sustain sufficient physical shock to loosen contained lime, and in this respect the amount of material placed in the drum should not be such as would reduce the impact area during operation.

Loading of material to the drum may be effected via existing doors or through doors provided specifically for the purpose.

Liquid-tight doors which enable the acid process to be carried out without removing the washed material from the drum may be fitted in place of drainage doors 5 and locked in position by the existing handles.

What I claim as my invention and desire to secure by Letters Patent is:

1. In combination with a rotary liquid container, a self-clearing grid for the drainage of liquid, such a grid comprising a plurality of hingedly supported rods which, when in closed position, co-operate to form a grating.

2. In combination with a rotary liquid container, a self-clearing grid as claimed in claim 1, in which said rods are disposed within a frame fitted in an aperture provided for its reception in the liquid container.

3. In combination with a rotary liquid container, a self-clearing grid as claimed in claim 1, in which said rods are mounted in opposed comb-like assemblies on shafts pivotally secured in said frame.

4. In combination with a rotary liquid container, a self-clearing grid as claimed in claim 1, and a counter-weight adapted to be actuated by the rotation of the container and connected to said rods for effecting a sudden separation of said rods of the grid.

5. In combination with a rotary liquid container, a self-clearing grid as claimed in claim 1, in which a frame is mounted on an outlet formed in said container, opposed shafts are pivotally connected to said frame and support said rods in comb-like assemblies, a counter-weight to be actuated through said container's rotation, linkage connecting said counter-weight and said shafts for causing said rods to intermesh and form a sieve-like drainage grid during approximately the lower half of their rotary travel and during the upper portion of their travel to separate and swing inwardly within the container on their respective shafts.

6. In combination with a rotary liquid container, a self-clearing grid as claimed in claim 1 in which said grid is secured within an aperture of the container by locking handles which are prevented from accidental displacement through toggle linkage.

EVAN GEORGE WILSON.

REFERENCES CITED

The following references are of record in the file of this patent:

UNITED STATES PATENTS

| Number | Name | Date |
| --- | --- | --- |
| 164,106 | Shaw | June 8, 1875 |